(12) United States Patent
Lallemant

(10) Patent No.: US 7,013,530 B2
(45) Date of Patent: Mar. 21, 2006

(54) DEVICE FOR DETACHABLE CONNECTION BETWEEN TWO ELEMENTS

(75) Inventor: Jean-François Lallemant, Le Mesnil le Roi (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 10/467,991

(22) PCT Filed: Feb. 13, 2002

(86) PCT No.: PCT/FR02/00557

§ 371 (c)(1),
(2), (4) Date: Jan. 15, 2004

(87) PCT Pub. No.: WO02/065260

PCT Pub. Date: Aug. 22, 2002

(65) Prior Publication Data

US 2004/0111837 A1    Jun. 17, 2004

(30) Foreign Application Priority Data

Feb. 13, 2001 (FR) .................................. 01 01918

(51) Int. Cl.
*E05F 1/08* (2006.01)
*E05D 7/10* (2006.01)

(52) U.S. Cl. ........................... 16/297; 16/355; 16/266; 16/260

(58) Field of Classification Search .................. 16/297, 16/260, 266–267, 269, 224, 355–356, 334, 16/327, 344–345; 361/680–683; 403/109, 403/120, 121, 146; 248/922–924, 918, 919, 248/921, 920; 220/840, 841, 831, 845, 847, 220/4.22, 4.23

See application file for complete search history.

(56) References Cited

U.S. PATENT DOCUMENTS

| | | | | |
|---|---|---|---|---|
| 2,052,465 A | * | 8/1936 | Hardy, Jr. ..................... | 49/383 |
| 2,341,537 A | * | 2/1944 | Froelich ...................... | 16/267 |
| 2,641,018 A | * | 6/1953 | Snyder ........................ | 16/356 |
| 2,804,641 A | * | 9/1957 | Zavada ........................ | 16/275 |
| 3,718,943 A | * | 3/1973 | Bustin ......................... | 16/355 |
| 4,333,206 A | * | 6/1982 | Lang et al. ................... | 16/335 |
| 4,406,379 A | * | 9/1983 | Anderson et al. ........... | 220/829 |
| 4,584,739 A | * | 4/1986 | Konen .......................... | 16/266 |
| 4,942,271 A | * | 7/1990 | Corsi et al. ................. | 174/101 |
| 4,993,772 A | * | 2/1991 | Charen ...................... | 296/97.1 |
| 5,428,350 A | * | 6/1995 | Kurcbart et al. ........... | 340/7.63 |

(Continued)

FOREIGN PATENT DOCUMENTS

JP       2000010654 A   *   1/2000

(Continued)

*Primary Examiner*—Chuck Mah
(74) *Attorney, Agent, or Firm*—Greenberg Traurig LLP

(57) ABSTRACT

The invention concerns a removable linking device 1 between a first element 3 and a second element (2).

Figure 1:
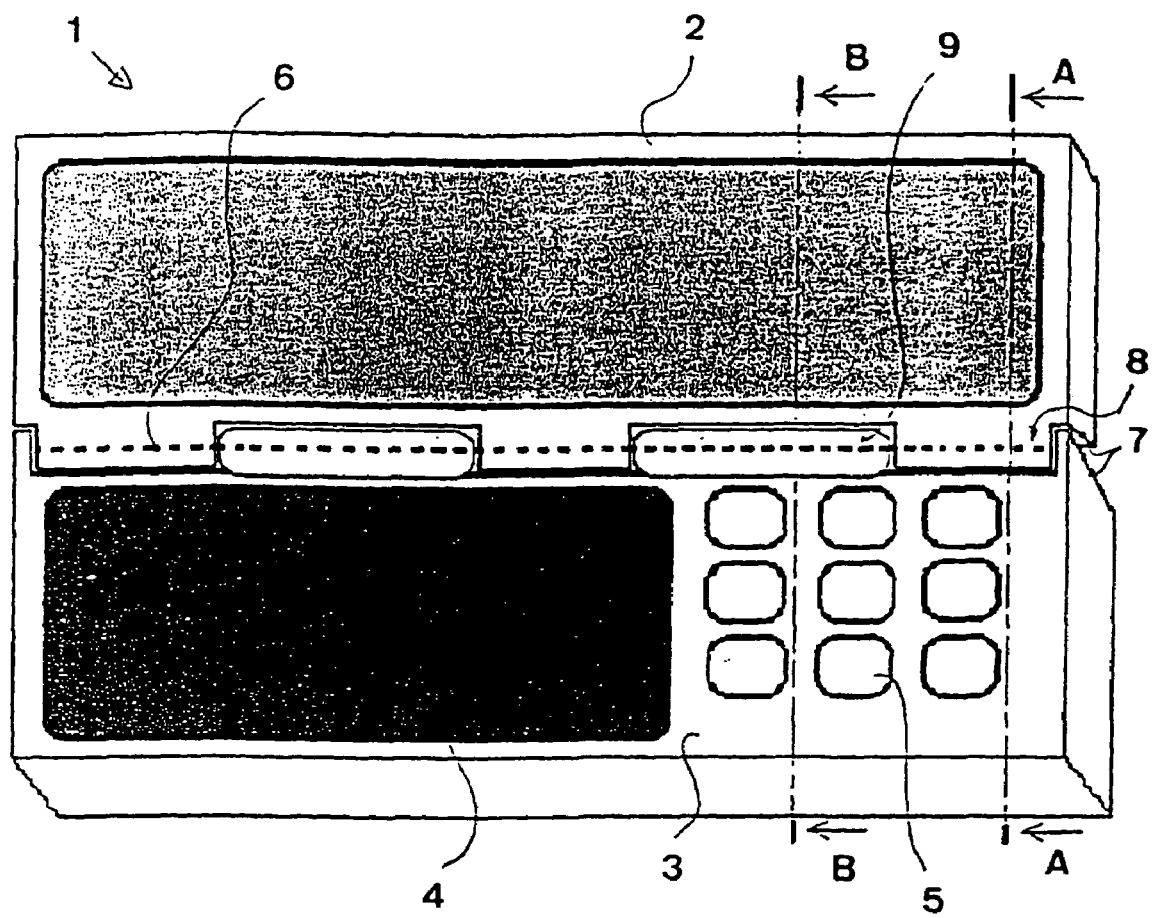

It comprises a reception cradle (13) delimited by the first element (3), on the one hand, and a connecting means (20) integral to the second element (2) on the other hand, the said means (20) being connected to the cradle (13) on one side by holding means (21) and, on the other, by a flexible means (22) which can be eliminated to allow the separation of the two elements. The cradle (13) delimits a reception space (14) in which the connecting means (20) is inserted. The cradle (13) delimits a reception wall (15) of the holding means (21).

13 Claims, 6 Drawing Sheets

U.S. PATENT DOCUMENTS

| | | | | |
|---|---|---|---|---|
| 5,465,557 A | * | 11/1995 | Harte | 53/510 |
| 5,494,447 A | * | 2/1996 | Zaidan | 439/31 |
| 5,528,796 A | * | 6/1996 | Perry et al. | 16/355 |
| 6,317,315 B1 | * | 11/2001 | Lee et al. | 361/681 |
| 6,351,373 B1 | * | 2/2002 | Le et al. | 361/683 |

FOREIGN PATENT DOCUMENTS

| | | | | |
|---|---|---|---|---|
| JP | 2000192941 A | * | 7/2000 |
| JP | 2000207058 A | * | 7/2000 |
| JP | 2004164109 A | * | 6/2004 |

* cited by examiner

DEVICE FOR DETACHABLE CONNECTION BETWEEN TWO ELEMENTS

The technical domain of this invention is that of linking devices between two elements, in particular between a screen and its support.

Information technology units such as laptop computers or scanners, and in particular scanners for reading games tickets consist of a casing on which a screen is fixed. The latter often opens by turning about an axle of rotation integral to the casing. One of the main disadvantages of this linking is that it cannot be dismantled, making the screen irremovable in relation to the casing. The result of this irremovability is that, during a preventive or corrective maintenance operation, it is necessary to take away the complete unit, even though the fault is very often located on one or other of the elements, but rarely on both of them. Moreover, this irremovability obliges maintenance operators to transport complete units (casing and screen) and therefore to handle large volumes of equipment.

The aim of this invention is therefore to alleviate the above-described disadvantages principally by making it possible to remove a screen simply and quickly in relation to a casing.

The subject of the invention is therefore a removable linking device between a first element and a second element, characterised in that it comprises a reception cradle delimited by the first element, on the one hand, and a connecting means integral to the second element on the other hand, the said means being connected to the cradle on one side by holding means and, on the other, by a flexible means which can be eliminated to allow the separation of the two elements.

Advantageously, the cradle delimits a reception space in which the connecting means is inserted.

According to one characteristic of the invention, the cradle delimits a reception wall of the holding means.

According to another characteristic, the holding means delimits a fork with two branches between which the reception wall is engaged, one branch being equipped with a journal cooperating with the reception wall in order to ensure the rotation of the connecting means with respect to the cradle.

According to yet another characteristic, the reception wall has a complementary profile to that of the journal.

According to yet another characteristic, the reception wall and the fork are in mutual abutment when the two elements are in the snap-fastened position.

Advantageously, the flexible means consists of a resilient supple wall equipped along its free edge with a notch intended to cooperate with a lug delimited by the cradle.

According to yet another characteristic of the invention, the second element is articulated with respect to the connecting means.

According to yet another characteristic, the second element contains a wall in the shape of an arc of a circle cooperating with a complementary wall of the cradle defining a housing in which the said wall engages in order to limit the travel of the second element with respect to the first.

The first element may be represented by a casing of an electronic apparatus and the second element by a screen connected to this apparatus. The device may comprise a means for adjusting the inclination of the screen with respect to the casing, this adjusting means advantageously consisting of a strut cooperating with a multiposition support.

A very first advantage of the device according to the invention lies in the ease and rapidity with which a screen can be disconnected with respect to the casing.

Another advantage lies in the simplification of maintenance operations and in a reduction in the costs thereof.

Figure 2:
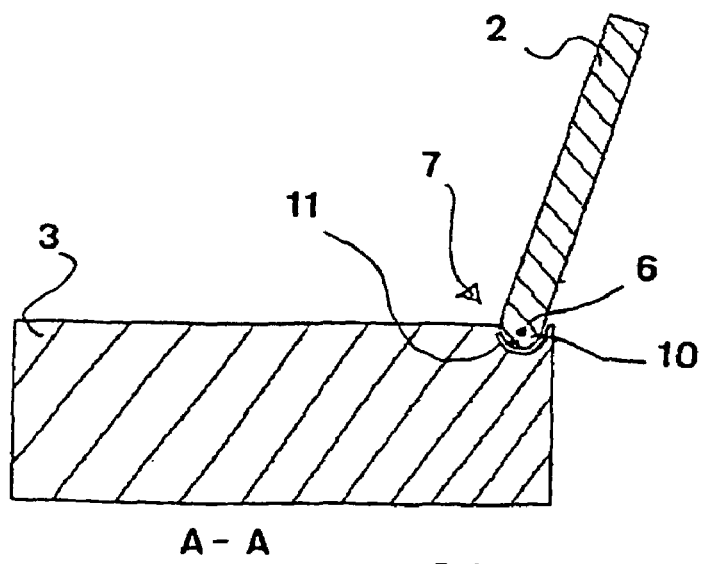
Figure 3:
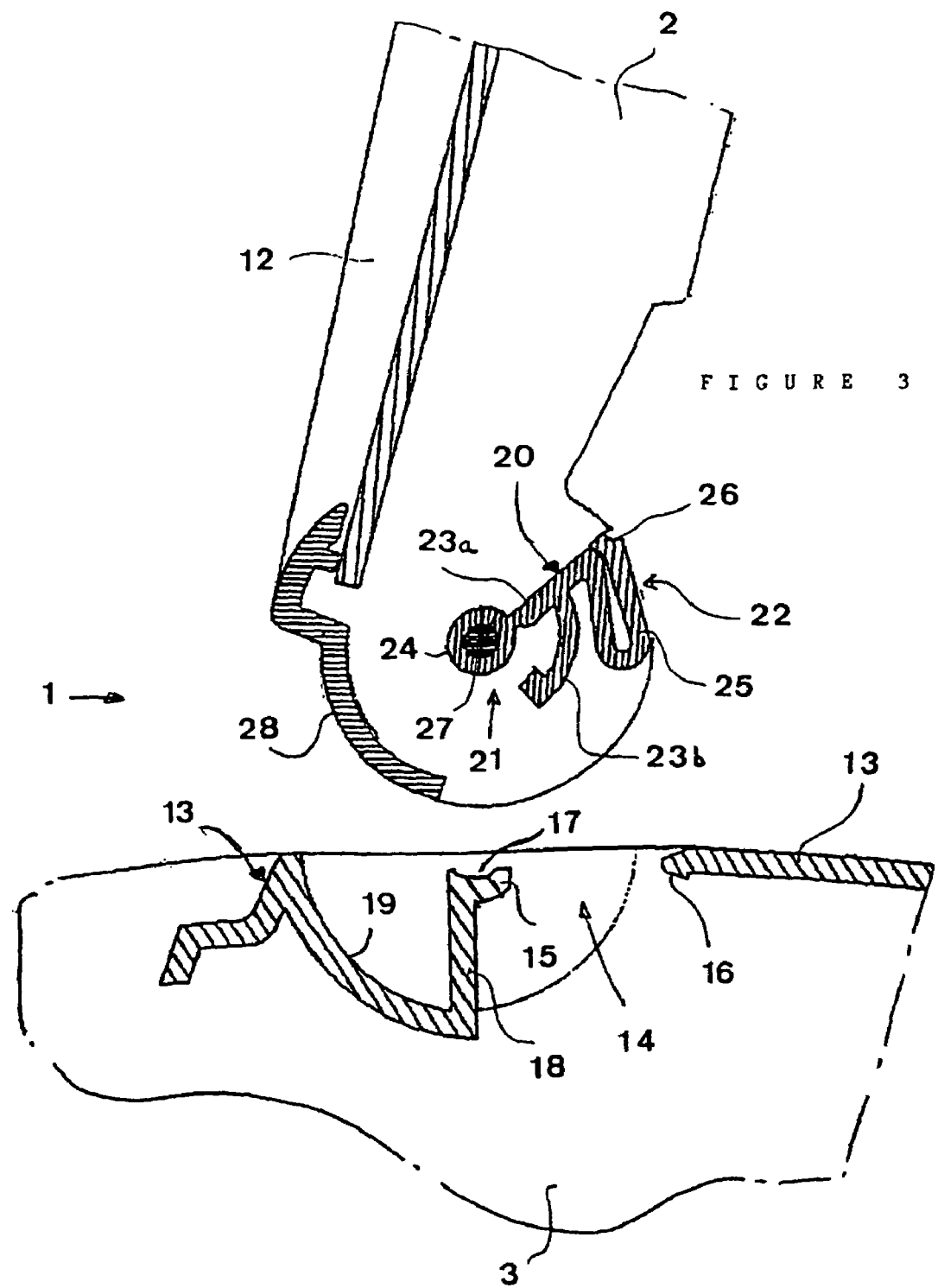
Figure 4:
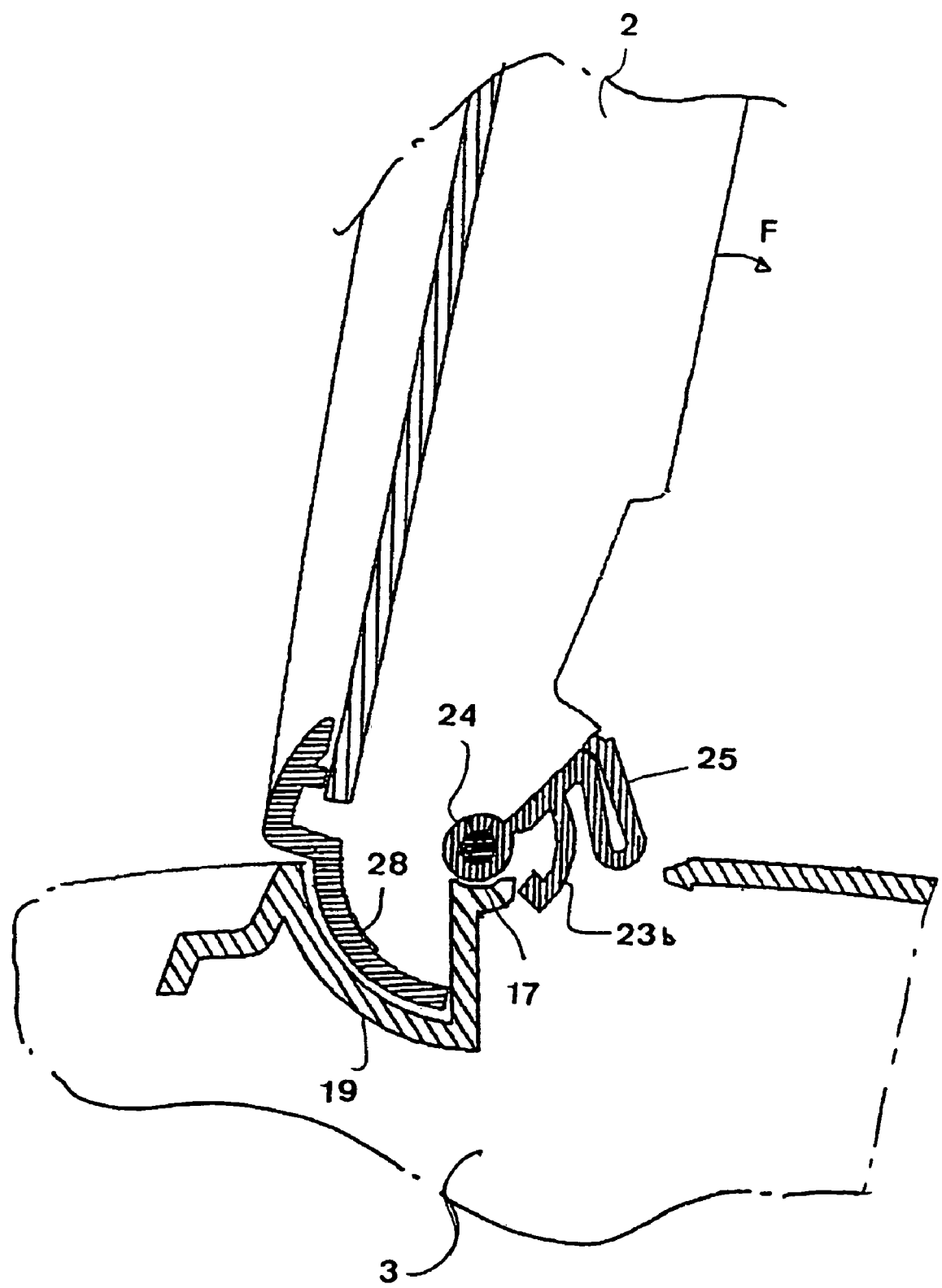
Figure 5:
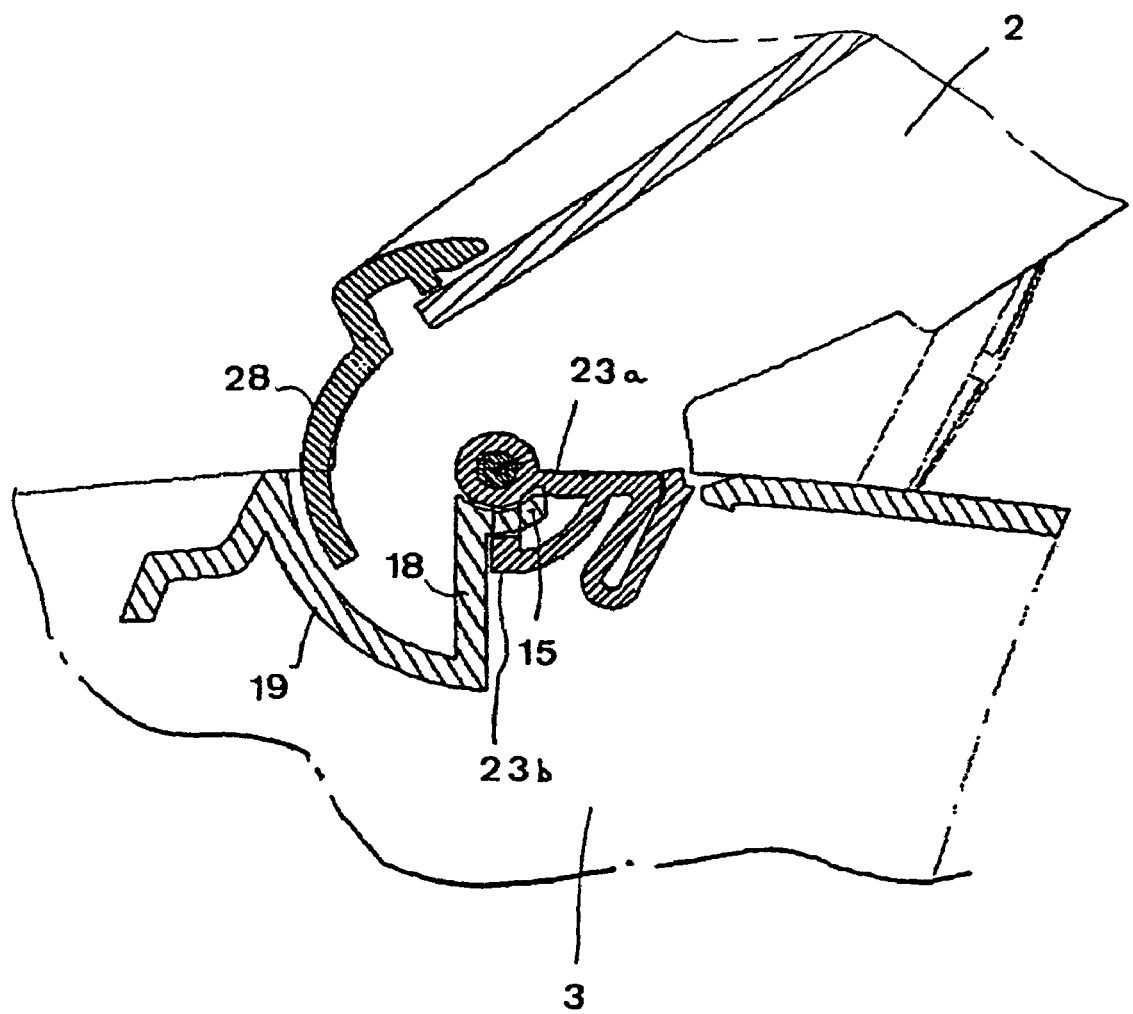
Figure 6:
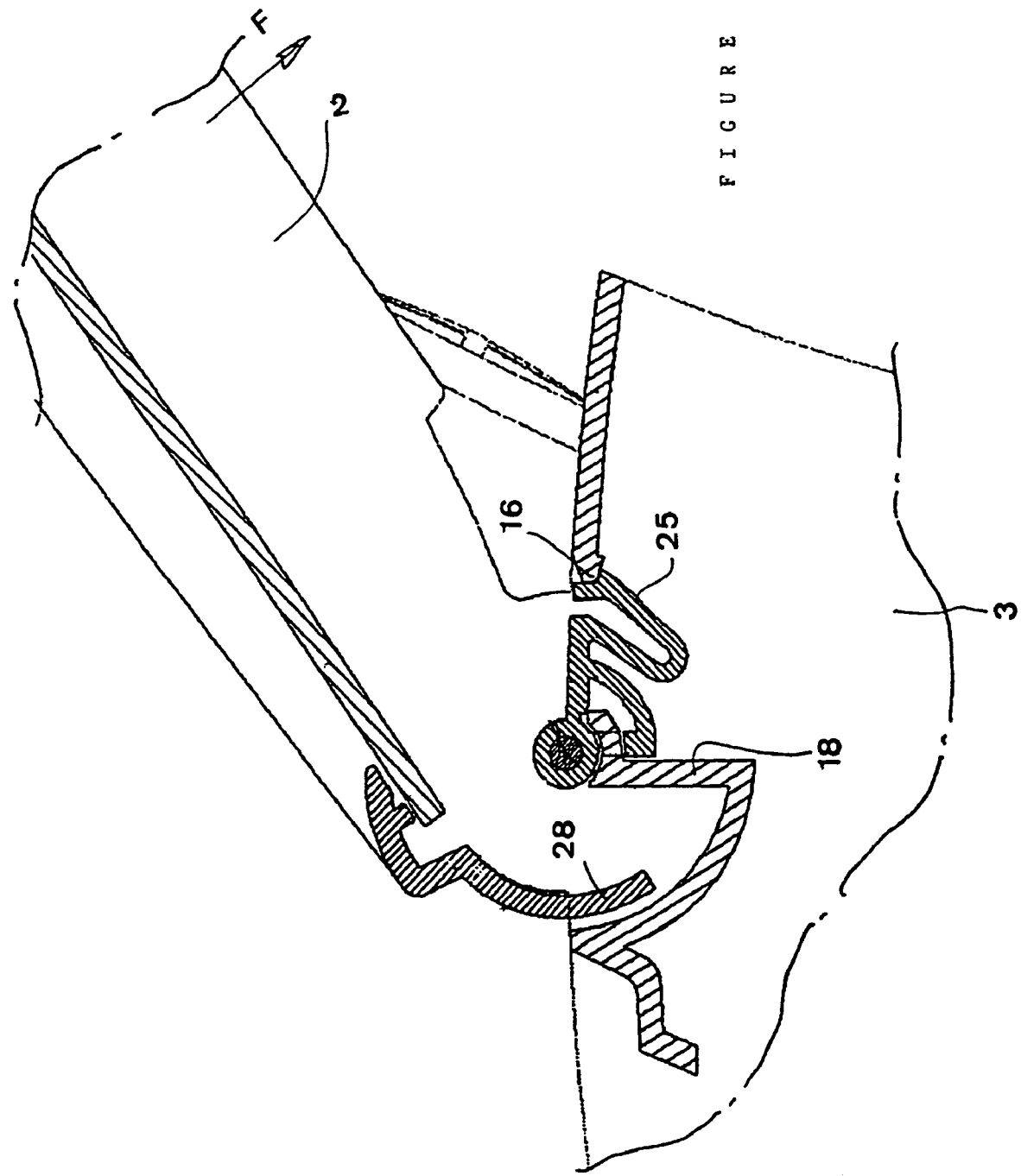
Figure 7:
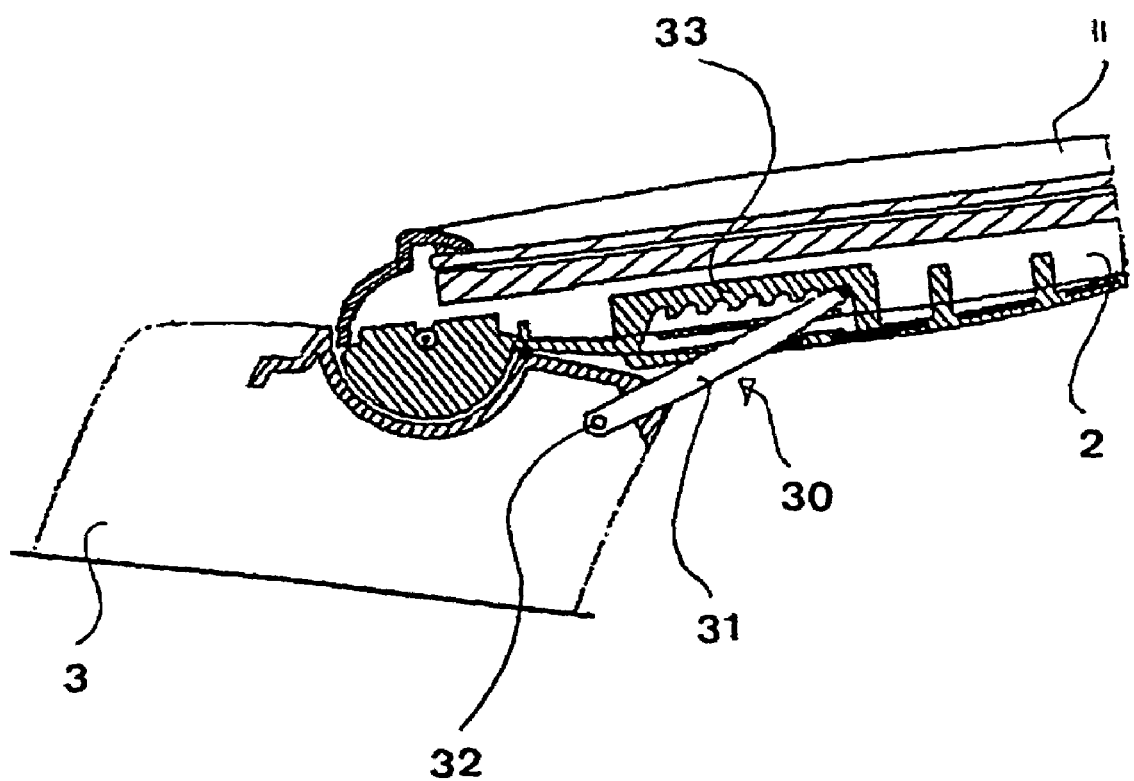

Other characteristics, details and advantages of the invention will emerge more clearly on reading the description given hereafter by way of indication in relation to the drawings, in which:

FIG. 1 is a schematic representation of the linking device between two elements according to the invention, FIG. 2 is a section along A—A of FIG. 1, FIG. 3 is an exploded sectional view, along B—B, illustrating the structure of the two elements, FIG. 4 is a view showing the initial position of the cradle and the connecting means, FIGS. 5 and 6 are views illustrating the device during attaching and snap-fastening, and FIG. 7 is a sectional view illustrating a means for adjusting the inclination of the second element.

As previously indicated, the device according to the invention makes it possible to removably connect two elements to each other, and in such a way that they are articulated one with respect to the other. In fact, in numerous applications it is extremely useful to be able to rapidly disassemble two parts of an electronic or mechanical unit so as to be able to separate them when an intervention is required on one of them. Thus, in practice, and in order to clarify the interest of the invention, the first element may be an electronic casing of a machine, and the second element a screen connected thereto. FIG. 1 represents a linking device 1 in a schematic form which shows the articulation of a second element or screen 2 with respect to a first element or casing 3. This casing may support, for example, a scanner 4 and a keyboard 5 for use as a games ticket reader by a tobacconist in a very particular application of the invention. Of course, this casing 3 may support all the elements necessary for any kind of use which may be envisaged by the manufacturer. The screen 2, of LCD type, in colour, with an active matrix, or any other type, is articulated about an axle of rotation 6 with respect to the casing. The linking device has, at the edge 7 which is common to the casing 3 and the screen 2, at least one rotational pin 8 and at least one removable link 9.

FIG. 2 displays for greater clarity the design of the rotational pin 8. This conventionally consists of a journal 10 of general cylindrical form integral to the edge of the screen 2. This journal 10 is complementary with a recess 11 made in the casing 3.

In a similar way, the recess may be made in the screen opposite a journal coming out from the casing.

FIG. 3 is a sectional view along B—B illustrating more particularly the construction of the removable linking device 1. The second element or screen 2 is partially represented, the front face 12 of the latter being oriented towards a user. The first element 3 or casing is also partially represented. The elements 2 and 3 are shown in the disconnected position to aid comprehension.

The casing 3 is equipped with a cradle 13 which defines a reception space 14 delimiting a reception wall 15 and a lug 16. The wall 15 has a semi-cylindrical profile 17 oriented towards the screen 2 and is extended by a longitudinal wall 18 and a wall 19 in the shape of an arc of a circle. The second element or screen 2 is extended in the drawing in its lower part by a connecting means 20 consisting of holding means 21 and a flexible means 22. The holding means delimit a fork with two branches 23a and 23b between which the wall 15 is brought to engage. The branch 23a is equipped with a journal 24 intended to cooperate with the wall 15 to ensure the rotation of the connecting means 21 with respect to the cradle 13. Of course, the reception wall 15 has a complementary profile to that of the journal 24. The flexible means 22 consists of a resilient supple wall 25 extending the two branches 23 in the form of a loop and equipped along its free edge with a notch 26 intended to cooperate with the lug 16 of the cradle.

In the figure, it can be seen that the journal 24 supports an axle 27 which makes it possible for the screen to rotate with respect to the connecting means 21. The screen 2 is equipped in a complementary manner with a skirt 28 in extension of its face before ending in the form of an arc of a circle according to a profile corresponding to that of the wall 19 of the cradle.

To attach the screen 2 and the casing 3, the following method is used. The screen 2 is placed above the casing 3 as shown in FIG. 3 and the connecting means 20 is engaged in the free space 14 by placing the journal 24 on the surface 17. In this position, shown in FIG. 4, the skirt 28 comes into position against the wall 19 in concordance with their shape. In this position, the screen is in abutment against the casing via the application of the skirt 28 against the wall 19. In this figure, the resilient wall 25 is represented in the prestressed position by pinching of the loop which is retracted with respect to the cradle. The linking of the screen 2 with the casing 3 is carried out by imparting to the screen a rotational movement along the arrow F after a first rotation represented in FIG. 5. The introduction of the connecting means in the space 14 of the cradle causes in a general manner the centring of the screen 2 with respect to the casing 3 and more particularly the centring of the journal 24 on the surface 17. This limitation is conceived as is necessary and sufficient to allow the complete engagement or disengagement of the screen with respect to the casing. The travel of the screen with respect to the casing is thus limited.

In the semi-snap-fastened position represented in FIG. 5, it can be seen that the reception wall 15 and the fork 23 are in mutual abutment. In this position, the arm 23a of the fork is bearing on the wall 15 while the other arm 23b of the fork comes to bear on the wall 18. The connecting means 20 is therefore in a locked position and cannot be separated from the cradle and the locking of the screen 2 can thus take place.

This complete locking is represented in FIG. 6 which shows the screen 2 completely integral to the casing 3. To achieve this, the flexible wall 25 is released and catches on the lug 16 of the cradle 13. As an alternative, the flexible wall can be eliminated, it being made to bear upon the lug until it disappears by rotation of the screen.

When the connecting means is locked, the screen 2 can turn freely between the final position represented in FIG. 6 by rotation about the axle 27 and an initial position (not shown) in which the skirt 28 comes into abutment against the wall 18.

To separate the screen 2 from the casing 3, one begins, following FIG. 6, by first of all eliminating the notch 26 of the flexible wall 25 in order to release the lug 16. The screen is then turned; its rotation in the opposite direction to the arrow F drives the connecting means 20 which thus emerges from the space 14 to occupy the position represented in FIG. 4. All that remains to do is to remove the screen by lifting it up in order to release the cradle as shown in FIG. 3. One then need only disconnect the cable from the screen in order to totally separate the screen from the casing and work on the casing or replace this screen.

FIG. 7 shows the means 30 for adjusting the inclination of the screen 2 with respect to the casing 3. The latter consists of a strut 31 connected by one of its ends to the casing 3 via an axle 32. This linking allows the rotation of the strut 30 about the axle 32. The opposite end of the strut 31 is resting in a multiposition support 33 integral to the screen 2. The positioning of the strut 31 with respect to the multiposition support 33 makes it possible to vary the inclination of the screen 2 with respect to the casing 3. The detachment of the screen is not hindered by this adjusting means 30 because the strut 31 is only resting in notches made in the multiposition support 33 and may be easily detached.

The invention claimed is:

1. Removable linking device (1) between a first element (3) and a second element (2), characterised in that the linking device comprises a reception cradle (13) defining a reception space (14) delimited by the first element (3), on the one hand, and a connecting means (20) integral to the second element (2), on the other hand, the said means (20) having a holding means (21) for engaging the cradle (13) and a flexible means (22) for cooperating with the cradle, and the said means (20) being connected to the cradle (13) on one side of the space (14) by the holding means (21) and, on the other side of the space (14), by the flexible means being able to move aside to allow the separation of the two elements, wherein the holding means (21) delimits a fork with two branches (23a, 23b) between which the reception wall (15) is engaged; wherein one branch (23a) is equipped with a journal (24) cooperating with the reception wall (15) in order to ensure the rotation of the connecting means (20) with respect to the cradle (13); and wherein the reception wall (15) has a complementary profile (17) to that of the journal (24); wherein the reception wall (15) and the fork (23) are in mutual abutment when the two elements (2,3) are in the snap-fastened position; and wherein the flexible means (22) consists of a resilient supple wall (25) equipped along a free edge with a notch (26) capable of cooperating with a lug (16) delimited by the cradle (13).

2. Removable linking device according to claim 1, wherein the cradle (13) delimits a reception space (14) in which the connecting means (20) is inserted.

3. Removable linking device according to claim 1, wherein the cradle (13) delimits a reception wall (15) for the holding means (21).

4. Removable linking device according to claim 1, wherein the first element (3) is represented by an electronic casing and the second element (2) a screen connected to this apparatus.

5. Removable linking device according to claim 4, wherein a means (30–33) for adjusting the inclination of the screen (2) with respect to the casing (3) is provided.

6. Removable linking device according to claim 5, wherein the adjusting means (30–33) comprises a strut (31) cooperating with a multiposition support (33).

7. Removable linking device (1) between a first element (3) and a second element (2), characterised in that the linking device comprises a reception cradle (13) defining a reception space (14) delimited by the first element (3), on the one hand, and a connecting means (20) integral to the second element (2), on the other hand, the said means (20) having a holding means (21) for engaging the cradle (13) and a flexible means (22) for cooperating with the cradle, and the said means (20) being connected to the cradle (13) on one side of the space (14) by the holding means (21) and, on the other side of the space (14), by the flexible means being able to move aside to allow the separation of the two elements, wherein the second element (2) is articulated with respect to the connecting means (20).

8. Removable linking device according to claim 7, wherein the second element (2) contains a wall (19) in the shape of an arc of a circle cooperating with a complementary wall (28) of the cradle defining a housing in which the said wall (19) engages in order to limit the travel of the second element with respect to the first.

9. Removable linking device according to claim 7, wherein the cradle (13) delimits a reception space (14) in which the connecting means (20) is inserted.

10. Removable linking device according to claim 7, wherein the cradle (13) delimits a reception wall (15) for the holding means (21).

11. Removable linking device according to claim 7, wherein the first element (3) is represented by an electronic casing and the second element (2) a screen connected to this apparatus.

12. Removable linking device according to claim 7, wherein a means (30–33) for adjusting the inclination of the screen (2) with respect to the casing (3) is provided.

13. Removable linking device according to claim 7, wherein the adjusting means (30–33) comprises a strut (31) cooperating with a multiposition support (33).

* * * * *